United States Patent
Illsley et al.

(10) Patent No.: US 9,605,180 B2
(45) Date of Patent: Mar. 28, 2017

(54) OVERPRINT VARNISHES REDUCING ODOR AND CONTAMINANTS

(71) Applicant: SUN CHEMICAL CORPORATION, Parsippany, NJ (US)

(72) Inventors: Derek Illsley, Bath (GB); Stephen Hall, Wells (GB); Darren Pocock, Bridgewater (GB)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 14/422,277

(22) PCT Filed: Aug. 26, 2013

(86) PCT No.: PCT/US2013/056617
§ 371 (c)(1),
(2) Date: Feb. 18, 2015

(87) PCT Pub. No.: WO2014/035880
PCT Pub. Date: Mar. 6, 2014

(65) Prior Publication Data
US 2015/0191627 A1  Jul. 9, 2015

Related U.S. Application Data

(60) Provisional application No. 61/694,352, filed on Aug. 29, 2012.

(51) Int. Cl.
C09D 179/02 (2006.01)
C09D 177/00 (2006.01)
B41M 7/00 (2006.01)

(52) U.S. Cl.
CPC ......... *C09D 179/02* (2013.01); *B41M 7/0036* (2013.01); *C09D 177/00* (2013.01); *Y10T 428/24802* (2015.01); *Y10T 428/24868* (2015.01)

(58) Field of Classification Search
CPC ........... C09D 179/02; Y10T 428/24802; Y10T 428/24868
See application file for complete search history.

(56) References Cited

U.S. PATENT DOCUMENTS

| | | | |
|---|---|---|---|
| 6,518,334 B1 | 2/2003 | Calhoun et al. | |
| 2002/0121631 A1* | 9/2002 | Rahman | C09D 4/00 252/500 |
| 2004/0081911 A1 | 4/2004 | Noglik et al. | |
| 2004/0137202 A1 | 7/2004 | Hamilton | |
| 2007/0212549 A1* | 9/2007 | Uehara | B32B 27/00 428/411.1 |
| 2009/0220880 A1 | 9/2009 | Moffat et al. | |
| 2010/0216951 A1 | 8/2010 | Webster et al. | |
| 2011/0085759 A1 | 4/2011 | Lee et al. | |
| 2012/0128877 A1 | 5/2012 | Jain et al. | |

FOREIGN PATENT DOCUMENTS

| | | | | |
|---|---|---|---|---|
| JP | 2001-122319 A | 5/2001 | | |
| JP | 2001122319 A | * 5/2001 | ............ | B65D 53/00 |
| WO | WO-99-46120 A2 | 9/1999 | | |
| WO | WO-2005-037935 A2 | 4/2005 | | |

OTHER PUBLICATIONS

International Preliminary Report from International Application No. PCT/US2013/056617, dated Mar. 3, 2015.
International Search Report issued in connection with International Application No. PCT/US2013/056617, dated Jan. 7, 2014.
Extended European Search Report issued in European Application No. 1383329.0, dated Feb. 18, 2016.

* cited by examiner

*Primary Examiner* — Betelhem Shewareged
(74) *Attorney, Agent, or Firm* — Ostrolenk Faber LLP; Charles C. Achkar

(57) ABSTRACT

Solvent-based, or water-based, coating compositions are disclosed having primary or secondary amine concentrations of greater than 1.0 mg KOH/g (coating) equivalent. These coatings, when applied over inks or other coatings, reduce the level of materials that cause odor or other contamination problems. These coatings when applied over radiation-cured inks and coatings reduce the level of odor and contamination resulting from uncured monomers and oligomers, and also of photoinitiators and their photodecomposition products.

27 Claims, No Drawings

OVERPRINT VARNISHES REDUCING ODOR AND CONTAMINANTS

CROSS-REFERENCE TO RELATED APPLICATIONS

The present application is a §371 National Phase application based on PCT/US2013/056617 filed Aug. 26, 2013, which claims the benefit of U.S. Provisional Application No. 61/694,352 filed Aug. 29, 2012, the subject matter of which is incorporated by reference in its entirety.

FIELD OF THE INVENTION

The present invention relates to an overprint coating or varnish (OPV) which, when applied to an uncoated, coated or printed substrate, is able to reduce the level of odorous and/or other contaminating species which would otherwise emanate from the substrate or printed substrate.

BACKGROUND OF THE INVENTION

There are a number of issues associated with radiation-cured inkjet fluids which make them particularly prone to generating high levels of migratable species. Firstly, the low viscosity of these fluids increases the effect of oxygen inhibition requiring the use of relatively high concentrations of photoinitiators, sometimes up to 10% (w/w), or greater, of the total ink formulation. Thus, the risk of contamination from photoinitiators and their photodecomposition side-products is increased. Secondly, the low viscosity requirement of inkjet fluids restricts the use of highly-functional and/or high molecular weight monomers and oligomers (which tend to have high viscosities) which are available for use in UV flexo, gravure and offset inks. The need to use mainly difunctional (and perhaps monofunctional) monomers, with only a limited amount of tri-, and higher, functional monomers and oligomers also increases the risk of unwanted migration from uncured material. Thirdly, inkjet fluids are applied at higher film weights than other traditional printing methods (around 8-12 µm). This also increases the risk associated with migration.

There are a number of patents describing polyethylene imine (PEI) as a component to reduce odors arising from aldehydes, acids, etc., but no teachings for using PEI (or other amines, especially polymer bound amines) in an overprint varnish to reduce migratables from underlying substrates or cured finished inks films, especially UV-curable finished ink films.

For instance, Milliken (US 2008/0164439A1) describes a wash-durable fabric treatment which is effective in eliminating chemicals associated with body odor. The basis of this treatment is an esterified PEI, which when applied to fabric was shown to reduce the level of isovaleric acid and isobutyraldehyde, even after 20 washes.

Aikoh Co. (U.S. Pat. No. 4,938,957) describes a deodorant composition comprising PEI, or an alkoxylated derivative of PEI, which was effective in reducing acetaldehyde and hydrogen sulfide levels.

Similarly, U.S. Pat. No. 4,941,991 describes a deodorant composition that could be applied to air filters to reduce the level of malodorous air-borne agents.

Xerox (U.S. Pat. No. 5,017,644) describes an (aqueous) inkjet composition containing an N-hydroxy substituted PEI. The PEI was used as a vehicle in the described ink composition with one of the mentioned advantages being an improvement to the open time. However, there is no mention of the odor-reducing capacity of this ink, nor is there any teaching of its use as an overprint varnish.

In terms of Inkjet fluids having low migration potential, WO2009/053348A1 describes UV-curable fluids which produce low levels of migratables upon curing. It also describes low migration radiation-curable inkjet fluids and reveals the use of a vinylether containing monomer in the preparation of radiation-curable inkjet fluids for low migration applications.

Accordingly, the prior art fails to teach an overprint coating or varnish (OPV) which can absorb the deleterious migratables emanating from a UV-cured ink or coating.

SUMMARY OF THE INVENTION

The present invention provides an OPV coating comprising a polymer or a compound having a primary and/or secondary amine group which, when applied to an uncoated, coated or printed substrate, is able to reduce the level of odorous and/or other contaminating species which would otherwise emanate from the substrate or printed substrate.

The present invention also provides a method of reducing the level of odorous and/or other contaminating species which would otherwise emanate from a substrate or a printed substrate comprising applying over said substrate or printed substrate an OPV coating comprising a polymer or a compound having a primary and/or secondary amine group.

The present invention further provides a printed article comprising the inventive OPV coating. The article may be a packaging material such as food packaging material.

Other objects and advantages of the present invention will become apparent from the following description and claims.

DETAILED DESCRIPTION OF THE INVENTION

Definitions

A coating applied over a printed substrate is an overprint coating or varnish. Part of the printing or finishing process, varnish is applied like a final layer of ink after a piece is printed. It may be clear or tinted and produce a dull, satin, or glossy finish. More than one type of overprint varnish may be used to create special effects. The overprint varnish may be applied as an all-over varnish (flood coating) or as a spot varnish (applied only to parts of the printed substrate or design).

The concentration of amine groups in a polymer is called the amine value of the polymer which is defined as the weight in milligrams of KOH equivalent to the total amine hydrogen content in one gram of polymer. The concentration of amine groups in a coating is called the amine value of the coating which is defined as the weight in milligrams of KOH equivalent to the total amine hydrogen content in one gram of coating.

The present invention provides an overprint coating or varnish that when applied over underlying coatings and inks, or other substrates, can dramatically reduce the level of species that cause odor and/or problems with contamination. The idea for this varnish arose from the need to reduce the level of low molecular weight contaminants emanating from UV-cured inks. These ink-jettable inks are intended for application on sensitive packaging such as food packaging, pharmaceutical packaging, etc. However, the varnish conceived here could be used very much more widely, to reduce the level of species causing odor and contamination problems outside the packaging market; for example to reduce the odor emanating from inks/coatings used in graphic/display designs where odor could be an issue.

Specifically, the present invention relates to an OPV coating comprising a polymer or a compound having a primary and/or secondary amine group which, when applied to an uncoated, coated or printed substrate, is able to reduce the level of odorous and/or other contaminating species which would otherwise emanate from the substrate or printed substrate.

Preferably, the polymer is selected from the group consisting of: poly(ethylene imine), poly(vinyl amine), amine-functional polyamide, amine-functional polyurethane and an amine-functional polymer derived from soya. More preferably, polymer is poly(ethylene imine).

Also preferably, the concentration of amine groups in the OPV coating is greater than about 1 mg KOH/g (coating) equivalent, more preferably more than about 5 mg KOH/g (coating), again more preferably more than about 7.5 mg KOH/g (coating) and most preferably more than about 10 mg KOH/g (coating).

The OPV coating can be water-based or solvent-based. The polymer in the OPV coating can also be formed in-situ and contains an amine-functional alkoxysilane. Preferably, the amine-functional alkoxysilane is any blend of (3-aminopropyl)triethoxysilane, (3-aminopropyl)trimethoxysilane and 3-[2-(2-aminoethylamino)ethylamino]propyltriethoxysilane.

The OPV coating of the present invention may further comprise a polyurethane/polyurea composition having an excess of polyfunctional amine to achieve a polymer-bound amine in-situ.

The OPV coating of the present invention may further comprise an epoxy-amine composition having an excess of polyfunctional amine to achieve a polymer-bound amine in-situ.

The OPV coating of the present invention can be applied over a radiation-cured coating to reduce the odor and migratables from the radiation-cured coating such as a radiation-cured coating intended for food packaging or other sensitive packaged produce.

Preferably, the OPV coating of the present invention reduces the level of migratable species in a foodstuff to less than 10 ppb, more preferably to less than 7 ppb, more preferably to less than 5 ppb. Again preferably, the OPV coating of the present invention reduces the level of odorous or contaminating compounds selected from the group consisting of: aldehyde, ketone, carboxylic acid, (meth)acrylate and alkyl halide groups from a cured UV ink film or a substrate.

The polymer present in the OPV coating of the present invention is preferably suitable for food packaging applications.

The present invention also relates to a method of reducing the level of odorous and/or other contaminating species which would otherwise emanate from a substrate or a printed substrate comprising applying over said substrate or printed substrate an OPV coating comprising a polymer or a compound having a primary and/or secondary amine group. Preferably, the application of the OPV coating of the present invention is over a printing ink. The application of the OPV can be to a substrate prior to a printing ink being applied or over the top of at least one layer of a previously applied coating.

The overprint varnishes of the present invention have been shown to dramatically reduce contaminants and odors that can migrate from UV-cured ink films. Typically, these contaminants are low molecular weight components including, for example, uncured acrylate monomers and aldehydes; the aldehydes typically arising from the photodecomposition of photoinitiators. But the overprint varnishes of the present invention could also reduce medium and high molecular weight contaminants.

The commercial advantages that this type of OPV could offer are clear. In any situation where odor or contamination problems occur (including migration problems in food packaging) arising from chemicals containing, for example, acid, aldehyde, ketone, acrylate, alkyl halide groups, among others, then application of overprint varnishes of the present invention will help to overcome/reduce these problems. In the case of materials migrating into foodstuffs from inks (and especially radiation-cured ink films) applying a layer of the varnish of the present invention will help to reduce the levels of the migrating species and subsequently reduce the level of any contamination of the packaged foodstuff. One of the principal modes by which an ink can contaminate foodstuff (or other sensitive packaged material) is by what is termed set-off migration. Set-off migration occurs when a printed surface comes into contact with the reverse side of the printed substrate and unbound material from the ink can diffuse or migrate into the reverse side of that substrate. When the printed substrate is then converted into packaging material, there exists the potential for the materials which have migrated into the reverse side of the substrate subsequently leaching out into the foodstuff (or other packaged material which needs to be protected against the risk of migratables). Therefore, applying varnishes of the present invention will attenuate the amount of migratables and hence reduce the risk of contamination of the foodstuff, or other packaged material. In the EU there are strict regulations regarding the amount of ink components and other chemicals which can migrate into food. These regulations are being led by the Swiss Ordinance, and in the case of radiation-cured inks and coatings, the maximum allowable level of migration of most commonly used (meth)acrylate monomers is 10 ppb (or 10 µg contaminant/Kg food). Where specific migration limits exist for other materials, these limits can be applied, but it would be highly preferable if the levels for all potential food contaminants could be kept below the 10 ppb level.

A further issue with radiation-cured coatings/inks, including some specified for food packaging, is that they can generate undesirable odors upon UV-curing, particularly as a result of the photodecomposition of photoinitiators. These by-products of the photoinitiation process are commonly aldehydes, ketones and acids. Even when photoinitiators specified for low migration applications, such as the difunctional hydroxyl-ketone types (e.g. Irgacure 127 (CIBA)), are used, they generate odorous decomposition by-products. Furthermore, most commercial photoinitiators contain a ketone group, and the varnishes of the present invention will reduce the levels of photoinitiators as well as their photodecomposition by-products which could otherwise cause contamination or odor problems.

Varnishes of the present invention if applied over these inks could help not only to further reduce the level of migratable species, but also help to improve the organoleptic properties of the printed matter, including the odor. The present invention could offer not only inks/coatings preferably meeting the regulatory requirements associated with food packaging, but by applying varnishes of the present invention could also lower the perceived odor levels of the printed matter, which would have a very positive impact upon the perception of the printed matter/packaging.

A exists to reduce the amount, and the odor, of the mesitaldehyde being generated as a photodecomposition product from phosphine oxide type photoinitiators. These photoinitiators have been found to be a key requirement in many UV-inkjet formulations. The level of mesitaldehyde (trimethylbenzaldehyde) produced from these types of photoinitiators during UV-cure is typically around 10 ppb, based on the standard EU package model, when an ink containing about 1-2.5% (w/w) of Irgacure 819 is cured. Not only this, but the odor threshold of this aldehyde is sufficiently low that cured inks containing this PI have a distinctive and, at times, strong associated odor which only dissipates very slowly under ambient conditions.

The invention relates to the use of an amine reagent contained within an overprint varnish (OPV) to consume the contaminants of a UV-cured ink. An OPV containing available amine would consume contaminants, for example odorous aldehydes, such as the mesitaldehyde being emitted from a phopshine oxide type photoinitiator, to form an enamine/imine. It would also conceivably react with residual photoinitiators in a similar fashion via their ketone functionalities.

The following is a scheme showing the reaction of amine with Aldehyde/Ketone:

Also, primary and secondary amines will react, via Michael addition, with acrylates as shown in the following scheme:

Thus, a preferable OPV would be one containing polymer-bound amine available to react with low molecular weight aldehydes, ketones and acrylates. The amine groups would also have the capacity to capture low molecular weight carboxylic acid species, such as residual acrylic acid or the oxidized derivatives of aldehydes. Such a coating would offer distinct advantages for printed material intended for sensitive applications, including food packaging, display graphics, and other printed material where odor/contamination can be problematic. As well as being potentially effective for UV-cured inks and coatings, such a lacquer might find use in other applications where aldehydes, ketones, acids and acrylates might pose a problem. An example of this application could be the reduction of the levels of acetaldehyde present in recycled PET, or the reduction of formaldehyde levels in phenol-formaldehyde cured coatings.

Preferably, the coating compositions of the present invention are solvent-based, or water-based, having primary or secondary amine concentrations of greater than 1 mg KOH/g (coating) equivalent. These coatings when applied over radiation-cured inks and coatings reduce the level of odor and contamination resulting from uncured monomers and oligomers, and also of photoinitiators and their photodecomposition products.

Particularly preferred amine-containing materials used in coatings of the present invention are those which are bound to polymeric backbones. Particularly preferred polymeric amines include polyethylene imines, especially preferred types being those approved for use in food packaging applications.

It is believed that the coatings of the present invention are the first reported instances of varnishes which can be applied over inks or other coatings and actively scavenge components of the inks that would otherwise cause odor or contamination problems. The use of barrier coatings which slow the diffusion of migrating species are known. However, barrier coatings merely slow the diffusion rate of the migrating species and if, for instance, a printed reel of substrate is left for an extended period before being converted into filled food packaging then there is an increased risk of contamination of the packaged material.

The present invention is drawn to a coating comprising primary or secondary amines, which is able to reduce the level of a range of odorous and other potentially contaminating species present in the substrate to which it is applied. The amine groups present in the coating are able to remove odorous, or other contaminating species by the reaction of those compounds with the amine contained within the coating. Particularly preferred amines are those which are bound to a polymer backbone; this is achieved by using polymers with amines attached to them or by forming polymer-bound amine groups in-situ within the coating. The concentration of the primary and/or secondary amines in the coating is preferably greater than 1 mg KOH/g (Coating) equivalent. The amine groups react with a range of compounds which can cause odor or contamination problems such as; aldehydes, ketones, acids and (meth) acrylates.

Varnishes of the present invention are especially effective in reducing the level of odor and low molecular weight species (<1000 amu) that may cause contamination problems, emanating from radiation-cured coatings. Most commonly, photoinitiators are used to produce the radical initiating species for the UV-curing of photopolymerizable compositions containing blends of (meth)acrylate monomers and oligomers. These photoinitiators can themselves be odorous and also, as a function of the UV-curing process, they produce a range of photodecomposition by-products which can further add to the odor of the cured coating as well as generating compounds which can cause contamination problems. A particular concern for radiation-curable coatings is for their application in food packaging and other sensitive applications. In the case of food packaging there exists within the EU strict regulatory guidelines concerning the amount of compounds migrating from a radiation-cured coating or ink into the foodstuff. In the case of the majority of monomers used to formulate such coatings and inks the requirement is that the level of chemical contamination of the foodstuff is less than 10 ppb (i.e. 10 μg per Kg of food). One of the principal routes that UV-cured inks and coatings can contaminate foodstuffs is via what is known as set-off migration. This refers to the migration of contaminating species from the print surface to the reverse side of the printed matter, which would occur in stacks or reels of the aforementioned printed matter. Contamination of the foodstuff (or other sensitive) produce would then occur by absorption into the packaged goods from the contaminated reverse side of the printed substrate. Therefore, by applying coatings of the present invention to the printed surface of the substrate, most preferably by an in-line process, the amount of potentially contaminating species can be dramatically reduced.

Coatings of the present invention can also be applied directly to the substrate prior to it being printed with radiation-curable inks; this will help to reduce the risk of contaminating species permeating through the substrate to cause contamination of the packaged produce by a diffusional process.

Examples of photodecomposition by-products from photoinitiators include trimethylbenzaldehyde from trimethylbenzoyl diphenyl phosphine oxide (and other analogous phosphine oxide photoinitiators) and benzaldehyde from hydroxyl alkylphenone type photoinitiators. These aldehydes are formed by the corresponding benzoyl radicals abstracting hydrogen from a suitable H-donator present in the ink/coating. It is common to add tertiary amines to UV-curable coatings to act as such H-donors so as to generate reactive initiating species. The schemes below demonstrate the formation of the bezoyl radicals from examples of these two photoinitiators.

Scheme 1: The Formation of Benzoyl Radical from 1-hydroxycyclohexyl phenyl ketone

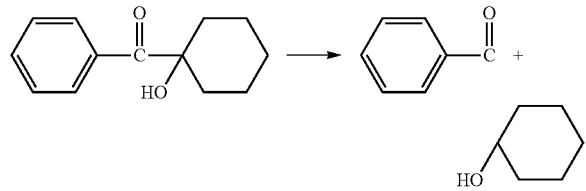

Scheme 2: The Formation of Benzoyl Radical from 2,4,6-trimethylbenzoyl diphenyl phosphine oxide

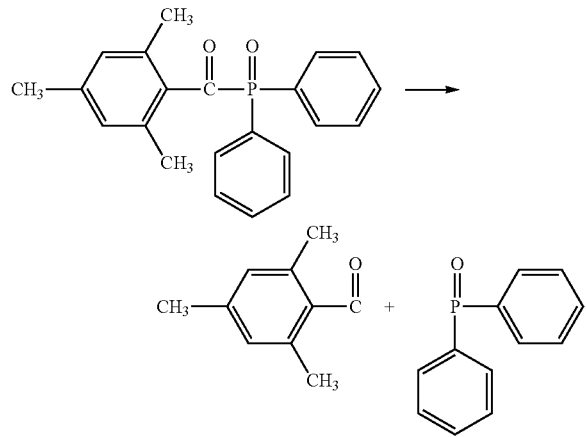

In the examples shown in the schemes above, the benzoyl radicals cannot only subsequently form the corresponding benzaldehyde but may also form other contaminating species such as the benzoic acid derivative. Aldehydes can be particularly odorous and it has been shown that the principal detectable photodecomposition by-product from a phosphine oxide type photoinitiator (Bis(2,4,6-trimethylbenzoyl)-phenylphosphineoxide) is indeed trimethylbenzaldehyde, which in its pure form has a very distinct, strong almond-like odor.

Scheme 3: The structure of Bis(2,4,6-trimethylbenzoyl)-phenylphosphineoxide

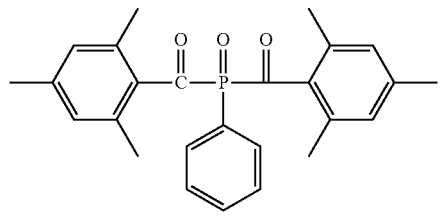

The amine groups contained within the coatings of the present invention have been shown to be very effective in reducing the level of benzaldehyde-type photoinitiator photodecomposition by-products by reaction to form a likely polymer-bound imine (or enamine). Thus, the potentially contaminating benzaldehyde-type photodecomposition product is removed by reaction with the polymer-bound amine.

Scheme 4: Reaction of Polymer-Bound Amine with Aldehyde.

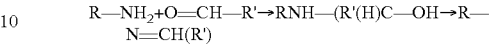

R—NH$_2$+O═CH—R'→RNH—(R'(H)C—OH→R—N═CH(R')

Scheme 5: Reaction of Polymer-Bound Amine with Acrylate Groups

R—NH$_2$+CH$_2$═CH.COOR'→RNHCH$_2$CH$_2$.COOR'

As well as aldehydes and (meth)acrylates, the polymer-bound amines of the present invention can react with a range of other materials to lessen the contaminating/odorous impact of those materials. Thus, organic materials having ketone, carboxylic acid, acyl, sulphonyl, and halide groups would also be consumed by coatings according to the present invention. Inorganic materials, particularly acids, will also be consumed by coatings of the present invention.

The coatings of the present invention, although useful in restricting the level of migration of low molecular weight species (those having a molecular mass of less than 1,000 amus) from radiation-cured coatings, would also be effective in limiting the amount of odor and contamination problems associated with other coatings and inks as well as odors/contaminants emanating from substrates themselves. For example, melamine-formaldehyde resins can cure with the release of formaldehyde; coatings of the present invention could help to reduce the levels of any residual formaldehyde.

Poly(ethyleneterephthalate) ('PET') is known to contain residual levels of acetaldehyde and therefore coatings of the present invention could help to reduce the levels of acetaldehyde trapped within PET that could otherwise cause contamination problems.

It is highly preferred that the primary and secondary amines are polymer-bound, so that any reaction product with the primary or secondary amine becomes immobilized and therefore their propensity to cause an odor, contamination or migration problem is thereby restricted. The primary or secondary amine groups can be incorporated into coatings of the invention by formulating the coating to contain polymers which themselves have primary or secondary amines attaches to them. There is no restriction on the type of polymer that has the primary or secondary amine groups attached to it, but examples of such polymers include; poly(ethyleneimines), poly(vinyl amines), amine-functional polyamides, polyetheramines, amine-functional polyurethanes/polyureas, amine-functional epoxy resins and protein-based polymers such as 'Procote', a polymer derived from soya beans.

It is also possible to formulate reactive coatings so that low molecular weight reactive species containing the required amine group become bound into the coating matrix via a chemical reaction. Examples of processes that can produce polymer-bound amine groups include 2-pack polyurethane-polyurea coatings (where an excess of a difunctional amine reagent is used in combination with a polyfunctional isocyanate co-reagent, for example) and 2-pack epoxy-amine coatings (where an excess of the amine hardener is used to ensure that the polymer is terminated with the required amine functionality). It is also possible to produce coatings of the present invention by a sol-gel process whereby precursors such as (3-aminopropyl)triethoxysilane, (3-aminopropyl)trimethoxysilane and 3-[2-(2-aminoethylamino)ethylamino]propyltriethoxysilane are incorporated into coatings and the amine groups subsequently become bound into the coating via a sol-gel process whereby the alkoxy groups on the silane moiety are firstly hydrolyzed in the presence of water followed by condensation of the silanol groups to produce an immobilized silica network. It is also possible to form immobilized amine groups by their attachment to silica particles. For example, colloidal silica can be reacted with amine-functional alkoxy silanes.

The coatings of the present invention may be either water-based or solvent based, and can be applied by any common printing or coating processes. There is no restriction on the nature of the coating technology used to prepare the coating so long as the coating medium supports the amine-functional component. In the case of polymer-bound amine components being used, a second or more, resin/polymer might also be used in the preparation of the coating. For example, in the case of water-based coatings, the second resin component of the coating might be a water-soluble or water-dispersible resin. Although not restricted to any type of resin, examples of such co-resins would be those commonly encountered in the graphic arts industry, and might include water-soluble acrylic resins, water-dispersible acrylic resins, polyvinyl alcohols, water-soluble or water-dispersible polyurethanes and water-soluble or water-dispersible polyesters. Similarly, there is no restriction on the type of co-resin that might be used in solvent-based coatings of the present invention and typical examples would include those resins commonly used in the graphic arts industry. Examples of solvent-based co-resins include: poly(vinyl butyrals), other poly(vinylacetals), cellulose acetate polymers including cellulose acetate propionate and cellulose propionate, poly(vinyl acetate), rosin-based resins, ketone resins, acrylic resins, epoxide resins, polyurethanes and nitrocellulose.

As with most coating compositions, additives may be incorporated into the OPVs of the present invention to enhance various properties. A partial list of such additives includes but is not limited to adhesion promoters, light stabilizers, de-gassing additives, flow promoters, defoamers, antioxidants, UV stabilizers, surfactants, dispersants, plasticizers, rheological additives, waxes, silicones, etc.

The OPV coatings of the present invention may be applied by virtually any deposition process including; flexographic printing, gravure printing, offset printing, roller coating, spray coating, inkjet printing, etc.

There is no limitation to the types of UV-curable inks and coatings that the OPVs of the present invention can be printed over the top of. Examples include inkjet, flexo, gravure, screen, litho, spray, etc. In a preferred embodiment, the OPVs of the present invention would be incorporated into polymeric constructs used in packaging applications, especially food packaging applications.

There is no limitation to the types of substrates that the OPVs of the present invention can be printed over the top of so long as the OPV has sufficient adhesion and resistance properties for the end use application. Suitable substrates include: plastics, paper, board, other cellulosic substrates, coated and uncoated substrates, foils, metallics, etc. In a preferred embodiment, the OPVs of the present invention would be used on polymeric substrates used in packaging applications, especially food packaging applications.

EXAMPLES

The following examples illustrate specific aspects of the present invention and are not intended to limit the scope thereof in any respect and should not be so construed.

Assessing the Level of Migratable Species

The level of contamination from a print surface was determined by a 'set-off' migration test. This test involved blocking the printed surface (with or without the applied coating) to a 30 micron sheet of LDPE (low density poly (ethene)), at 10 tonnes for a period of 72 hours. The poly(ethene) film was then extracted into methanol, containing 0.02% (w/w) of MEHQ (stabilizer) for 3 hours before the methanol solution was analyzed by GC-MS. Thus, a blocked LDPE area of 90 $cm^2$ was extracted into 2 ml of methanol. The GC-MS was calibrated with known solutions of the analytes (monomers, oligomers, photoinitiators and photoinitiator decomposition products) and the results are reported as ppb, the amount of migratable material that would be present in 1 Kg of food according to the EU packaging model, where it is assumed that 600 $cm^2$ of substrate is required to package 1 Kg of food.

Preparation of UV-Curable Inks

The capacity of coatings according to the present invention to consume low molecular weight contaminating species were determined by curing an inkjet composition under the UV-radiation emitted by a medium pressure (H-bulb) lamp, and then applying the coating to the surface of the cured ink and assessing the level of migratable material according to the test method above.

Magenta UV-Curable Ink:

The composition for this ink was as follows:

78.5% (w/w) SR9003 (ex. Sartomer, propoxylated neopentyl glycol diacrylate);

5.0% (w/w) CN3715LM (ex. Sartomer, an acrylated amine);

4.0% (w/w) Genopol TX1 (ex. Rahn, a polymeric thioxanthone);

1.25% (w/w) Irgacure 819 (ex. BASF, a phosphine oxide type photoinitiator);

1.25% (w/w) Irgacure 127 (ex. BASF, a difunctional hydroxy ketone type photoinitiator); and 10.0% (w/w) Magenta Pigment Dispersion (a dispersion containing 21.0% (w/w) of Fastogen Super Magenta RG, the remainder comprising the dispersant, stabilizers, and SR9003).

Black UV-Curable Ink:

The composition for this ink was as follows:

35.0% (w/w) SR508 (ex. Sartomer, dipropylene glycol diacrylate);

15.0% (w/w) SR595 (ex. Sartomer, decanediol diacrylate);

14.9% (w/w) SR341 (ex. Sartomer, 3-methylpentanediol diacrylate);

10.0% (w/w) VEEA (ex. Nippon Shokubai, 2-(2-Vinyloxyethoxy)ethyl acrylate);

2.0% (w/w) CN3715LM;

4.7% (w/w) Genopol TX1;

2.0% (w/w) Omnipol BP (ex. IGM, a polymeric benzophenone);

2.3% (w/w) Irgacure 819;

2.5% KIP160 (ex. Lamberti, a difunctional hydroxy ketone type photoinitiator);

1.0% (w/w) Genopol AB1 (ex. Rahn, a polymeric aminobenzoate);

1.0% (w/w) Genorad 16 (ex. Rahn, a stabilizer);

0.2% (w/w) Ethanox 4703 (ex. Albemarle, a stabilizer);

0.5% (w/w) Tego Glide 410 (ex. Evonik, a slip additive); and 9.0% (w/w) Black Pigment Dispersion (a dispersion containing 28% (w/w) of Special Black 250, the remainder containing stabilizers, dispersants and SR508).

Examples 1-6: Water-based OPV Coatings Demonstrating the Invention

Water-based OPVs were prepared by dissolving a poly(ethylene glycol) (PEG) with a nominal molecular weight of 8000 amu (ex. Aldrich) in water, at a weight concentration of 25%. Coatings where 0, 2.5, 5.0, 10.0 and 25.0% of the PEG was replaced with Lupasol WF (ex. BASF, a polyethylene imine) were then prepared (Examples 2-6, respectively).

The magenta UV-curable ink described above was applied to a 36 μm PET film at a film thickness of 12 μm and cured with a UV-dose of 200 mJ/cm². The Example 2-6 water-based coatings were then applied over the top of this cured ink film, at a film thickness of 12 μm, and the level of migratable NPG(PO)DA and mesitaldehyde (the principal photodecomposition product identified from Irgacure 819) were determined according to the procedure described above.

Table 1 shows the results of these experiments. It is clear that as the concentration of the PEI in the lacquer increases, the levels of migratable mesitaldehyde, and NPG(PO)DA decrease. At a concentration of 5% PEI, the level of migratable mesitaldehyde is reduced by around 80% from 21.7 ppb to 3.8 ppb, and the level of migratable NPG(PO)DA is reduced by around 75% from 217 ppb to 59 ppb. At 10% PEI, both fall below the 10 ppb level.

The level of migratable NPG(PO)DA and mesitaldehyde from the cured magenta ink having no OPV coating applied to it (Example 1) were 21.7 and 217 ppb respectively, which clearly shows that PEG is not an effective barrier to the migration of these compounds.

The level of migratable NPG(PO)DA and mesitaldehyde from the cured magenta ink overprinted with an OPV with 0% PEI (Example 2) were 235 and 20.6 ppb respectively, which clearly shows that PEI provides the reduction of the migration of these compounds.

It was also observed, especially for those coatings containing, 2.5% or more (w/w, on the total solid content of the coating) of the polyethylenimine, that there was a significant reduction in the odor emanating from the printed and coated surface of the PET film.

with a UV dose of 150 mJ/cm². The solvent-based coatings were then applied to the cured ink film at a film thickness of 6 μm, and dried under a flow of warm air. The level of migratable species was determined by the test method described above and the results are provided in Table 2.

TABLE 2

Reduction in Migratables from the Black Ink, Cured at 150 mJ/cm², Observed with Amine-containing OPVs

| Component | Ex. 7 No OPV | Ex. 8 OPV 10% PEI | Ex. 9 OPV 5% PEI | Ex. 10 OPV 0% PEI |
|---|---|---|---|---|
| DPGDA | 9.5 | 0.8 | 1.7 | 4.4 |
| DDA | 9.7 | <0.5 | 1.4 | 1.5 |
| 3-MePDDA | 4.7 | 0.6 | 0.9 | 1.4 |
| VEEA | 8.4 | 0.7 | 1.1 | 2.7 |
| Mesitaldehyde | 12.4 | 0.3 | 0.4 | 0.5 |
| Theoretical Amine Value for the OPV | — | 23.4 mgKOH/g | 11.7 mgKOH/g | 0 |

The results in Table 2 indicate that PVB is an effective barrier against the migration of mesitaldehyde, although the coatings containing the poly(ethylene imine) are able to reduce the level of this migratable aldehyde yet further. Incorporating poly(ethylene imine) into the PVB-based coatings reduces the levels of migratable monomer significantly compared with the coating having no poly(ethylene imine).

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. An OPV coating having a concentration of amine groups in the coating greater than 1 mg KOH/g (coating) equivalent, comprising a polymer having a primary and/or secondary amine group which, when applied to an uncoated, coated or printed substrate, is able to reduce the level of

TABLE 1

Reduction in Migratables from the Magenta Ink, Cured at 200 mJ/cm², Observed with Amine-containing OPVs

| Component | Ex. 1 No OPV | Ex. 2 OPV 0% PEI | Ex. 3 OPV 2.5% PEI | Ex. 4 OPV 5% PEI | Ex. 5 OPV 10% PEI | Ex. 6 OPV 25% PEI |
|---|---|---|---|---|---|---|
| Mesitaldehyde | 21.7 | 20.6 | 13.0 | 3.8 | 1.1 | <1.0 (not detected) |
| NPGPODA | 217 | 235 | 120 | 59 | 9.9 | <2.0 (not detected) |
| Theoretical Amine Value for the OPV | — | 0 | 8.2 mgKOH/g | 16.3 mgKOH/g | 32.6 mgKOH/g | 81.5 mgKOH/g |

Examples 7-10: Solvent-Based OPV Coatings Demonstrating the Invention

Solvent-based OPVs were prepared by dissolving Mowital B16HH (a poly(vinylbutyral)—Kuraray) in ethanol so that the concentration of the subsequent solution was 17.9% (w/w). Coatings were then prepared where 5 and 10% of the poly(vinyl butyral) was replaced with the poly(ethylene imine), Lupasol WF (Examples 9 and 8 respectively). These coatings had a viscosity suitable for printing by a flexographic process.

The black UV-curable ink described above was applied to a 36 micron PET film at a film thickness of 8 μm and cured odorous and/or other contaminating species which would otherwise emanate from the substrate or printed substrate.

2. The OPV coating of claim 1, wherein the polymer is selected from the group consisting of poly(ethylene imine), poly(vinyl amine), amine-functional polyamide, amine-functional polyurethane and an amine-functional polymer derived from soya.

3. The OPV coating of claim 1, wherein the polymer is poly(ethylene imine).

4. The OPV coating of claim 1, wherein the concentration of amine groups in the coating is greater than 5 mg KOH/g(coating) equivalent.

5. The OPV coating of claim 1 being water-based.

6. The OPV coating of claim 1 being solvent-based.

7. The OPV coating of claim 1, wherein the polymer having a primary and/or secondary amine group is formed in-situ.

8. The OPV coating of claim 7, wherein the polymer contains an amine-functional alkoxysilane.

9. The OPV coating of claim 8, wherein the amine-functional alkoxysilane is a blend of (3-aminopropyl)triethoxysilane, (3-aminopropyl)trimethoxysilane and 3-[2-(2-aminoethylamino)ethylamino]propyltriethoxysilane.

10. The OPV coating of claim 7 further comprising a polyurethane/polyurea composition having an excess of polyfunctional amine to achieve a polymer-bound amine in-situ.

11. The OPV coating of claim 7 further comprising an epoxy-amine composition having an excess of polyfunctional amine to achieve a polymer-bound amine in-situ.

12. The OPV coating of claim 1 applied over a radiation-cured coating.

13. The OPV coating of claim 12 which reduces the odor and migratables from a radiation-cured coating.

14. The OPV coating of claim 13 which reduces the level of migratable species from a radiation-cured coating intended for food packaging or other sensitive packaged produce.

15. The OPV coating of claim 13 which reduces the level of migratable species in a foodstuff to less than 10 ppb.

16. The OPV coating of claim 1, wherein the polymer is suitable for food packaging applications.

17. The OPV coating of claim 1 which reduces the level of odorous or contaminating compounds selected from the group consisting of aldehyde, ketone, carboxylic acid, (meth)acrylate and alkyl halide groups from a cured UV ink film.

18. The OPV coating of claim 1 which reduces the level of odorous or contaminating compounds selected from the group consisting of aldehyde, ketone, carboxylic acid, (meth)acrylate and alkyl halide groups that could otherwise migrate from a substrate.

19. A method of reducing the level of odorous and/or other contaminating species which would otherwise emanate from a substrate or a printed substrate comprising applying over said substrate or printed substrate an OPV coating of claim 1.

20. The method of claim 19, wherein said application is over a printing ink.

21. The method of claim 19, wherein said application is applied to a substrate prior to a printing ink being applied.

22. The method of claim 19, wherein said application is applied over the top of at least one layer of a previously applied coating.

23. The method of claim 19, wherein the concentration of amine groups in the coating is greater than 5 mg KOH/g (coating) equivalent.

24. A printed article comprising the OPV coating of claim 1.

25. The printed article of claim 24 in which the article is a packaging material.

26. The printed article of claim 25 in which the packaging material is a food packaging material.

27. A printed article resulting from the process of claim 19.

* * * * *